US006324865B1

(12) United States Patent
Lee et al.

(10) Patent No.: US 6,324,865 B1
(45) Date of Patent: Dec. 4, 2001

(54) TRIPLE-EFFECT ABSORPTION CHILLERS WITH VAPOR COMPRESSION UNITS

(75) Inventors: Huen Lee; Jin Soo Kim, both of Taejon (KR)

(73) Assignee: Korea Advanced Institute of Science and Technology, Taigon (TW)

( * ) Notice: Subject to any disclaimer, the term of this patent is extended or adjusted under 35 U.S.C. 154(b) by 0 days.

(21) Appl. No.: 09/471,821

(22) Filed: Dec. 23, 1999

(30) Foreign Application Priority Data

Dec. 26, 1998 (KR) .................................................. 98-58889

(51) Int. Cl.[7] ..................................................... F25B 15/00
(52) U.S. Cl. ................................................. 62/476; 62/489
(58) Field of Search ............................... 62/476, 489, 483, 62/485, 141

(56) References Cited

U.S. PATENT DOCUMENTS

| Re. 36,045 | * | 1/1999 | Rockenfeller et al. ................. | 62/476 |
| 4,285,208 |   | 8/1981 | Takeshita et al. . | |
| 4,505,133 |   | 3/1985 | Malewski et al. . | |
| 4,520,634 |   | 6/1985 | Oouchi et al. . | |
| 4,551,991 |   | 11/1985 | Miyoshi et al. . | |
| 4,732,008 |   | 3/1988 | DeVault . | |
| 5,205,136 |   | 4/1993 | DeVault et al. . | |
| 5,653,116 | * | 8/1997 | Erickson et al. ..................... | 62/476 X |
| 5,727,397 | * | 3/1998 | He ...................................... | 62/476 X |
| 5,931,007 | * | 8/1999 | Sgamboti et al. ................. | 62/476 X |
| 5,941,094 | * | 8/1999 | Tang et al. .......................... | 62/489 X |
| 5,966,948 | * | 10/1999 | Anand ................................ | 62/489 X |
| 6,003,331 | * | 12/1999 | Kohler et al. ......................... | 62/476 |

OTHER PUBLICATIONS

Boer et al., Combined Vapor Compression–Double Effect Absorption Cycle for Air Conditioning: A New High Performance Cycle, International Absorption Heat Pump Conference, AES31:483–486 (1993).*

E.A. Groll and R. Radermacher, Vapor Compression Heat Pumpt with Solution Circuit and Desorber/Absorber Heat Exchange, *International Absorption Heat Pump Conference*, AES31:463–469 (1993).

Norio Sawada et al., Cycle Simulation and Cop Evaluation of Absorption–Compression Hybrid Heat Pumps: Heat Amplifier Type, *International Absorption Heat Pump Conference*, AES31:471–476 (1993).

Akihiro Kawada et al., $NH_3/H_2O$ System Absorption–Compression Hybrid Heat Pump Cop Evaluation of Temperature Amplifier Type Heat Pumps, *International Absorption Heat Pump Conference*, AES31:477–481 (1993).

D. Boer et al., Combined Vapor Compression–Double Effect Absorption Cycle for Air Conditioning: A New High Performance Cycle, *International Absorption Heat Pump Conference*, AES31:483–486 (1993).

G. Grossman et al., Simulation and Performance Analysis of Triple–Effect Absorption Cycles, *ASHRAE Transactions:* Research 3781:452–462.

R.C. DeVault and G. Grossman, Triple–Effect Absorption Chiller Cycles, *International Gas Research Conference*, 1500–1508 (1902).

* cited by examiner

*Primary Examiner*—Henry Bennett
*Assistant Examiner*—Chen-Wen Jiang
(74) *Attorney, Agent, or Firm*—Darby & Darby

(57) ABSTRACT

The present invention provides a triple-effect absorption chiller with vapor compression units, where one or more vapor compressors are connected to GM, GH, or evaporator of a conventional chiller, to compress refrigerant vapor from the said generators or evaporator, thereby lowering the GH temperature to a preferable range of below 170° C. The triple-effect absorption chiller of the present invention can be practically applied for lowering the temperature of GH, without the corrosion due to the high temperature of GH.

3 Claims, 7 Drawing Sheets

TRIPLE-EFFECT ABSORPTION CHILLERS WITH VAPOR COMPRESSION UNITS

FIELD OF THE INVENTION

The present invention relates to a triple-effect absorption chiller with vapor compression units, more specifically, a triple-effect absorption chiller of a single serial-flow cycle, where one or more vapor compressors are connected to medium-, high-temperature generator, or evaporator, thereby compressing refrigerant vapor therefrom and maintaining the high-temperature generator at below 170°C.

BACKGROUND OF THE INVENTION

In general, absorption chillers use LPG, LNC, waste heat, or solar heat as an energy source, and accomplish the cooling effect by operating the absorber, condenser, evaporator and generator to circulate a working fluid of refrigerant/absorbent pair. Contrary to the conventional compression chillers using an energy source of electricity, the absorption chiller which employs heat as an energy source has been regarded as one of the alternative means for overcoming pending problems of the electrical overload during summer season and the regulation of banning the CFC use.

On the other hand, a triple-effect absorption chiller combining medium- and high-temperature generators with the conventional absorption chillers has been developed to maximize the energy consumption efficiency by way of employing refrigerant vapor from high-temperature generator('GH') as a heat source for medium-temperature generator('GM'), and the refrigerant vapor from GM as a heat source for low-temperature generator('GL'), respectively. The triple-effect absorption chiller is improved in terms of the energy efficiency by about 30%, compared to the conventional double-effect absorption chiller with only one GH.

The triple-effect absorption chiller is, however, proven to be less satisfactory in a sense that inorganic salt-based(e.g. lithium bromide) working fluid to maintain the temperature of GH at 200° C. or more, may bring about a serious corrosion in the chiller and non-condensible vapor formation at a temperature range of over 170° C., eventually decreasing the efficiency of chiller.

In this regard, several kinds of absorption chillers have been suggested in the art, to improve the efficiency of conventional absorption chillers and the corrosion problems of triple-effect absorption chillers.

For example, U.S. Pat. Nos. 4,520,634 and 5,205,136 and Grossman et al.(see: Grossman, G. et al., *ASHRAE Trans.*, 100(1): 452–462, 1994) describe multiple-effect absorption chillers whose efficiency is highly improved, while remaining the corrosion problems caused by working fluid operating at a high temperature.

Further, U.S. Pat. No. 4,732,008 teaches a triple-effect effect absorption chiller employing two refrigerating circuits to overcome the said corrosion problems, and Ouimette et al employs one additional high-temperature circuit of less corrosible working fluid to the conventional double-effect absorption chiller(see: Ouimette, M. S. and Herold, K. E., *Proc. International Absorption Heat Pump Conference AES* vol. 31, American Society of Mechanical Engineers, pp233–241, 1993).

U.S. Pat. No. 4,171,619 and Sawada et al.(see: Sawada, N. et al., *Proc. International Absorption Heat Pump Conference AES* vol. 31, American Society of Mechanical Engineers, pp471–476, 1993) illustrate a variety of methods for applying compressors to improve the efficiency of single-effect absorption chiller. In addition, Boer et al disclose a double-effect absorption chiller with one compressor employing a working fluid of methanol-glycerol to improve the efficiency of the chiller(see: Boer, D. et al., *Proc. International Absorption Heat Pump Conference AES* vol. 31, American Society of Mechanical Engineers, pp483–486, 1993).

SUMMARY OF THE INVENTION

The present inventors have made an effort to solve the corrosion problems of the triple-effect absorption chiller with a single serial-flow cycle, by employing the most effective working fluid of inorganic salt(absorbent)-water (refrigerant), and found that a triple-effect absorption chiller with one or more vapor compressors connected to medium-, high-temperature generator or evaporator to compress the refrigerant vapor coming from the said generators or evaporator, successfully lowers the temperature of GH to a preferable range of below 170° C., and prevents the corrosion of metal parts of the chiller.

A primary object of the present invention is, therefore, to provide an improved triple-effect absorption chiller with vapor compression units.

BRIEF DESCRIPTION OF DRAWINGS

The above object and features of the present invention will become apparent from the following descriptions given in conjunction with the accompanying drawings, in which.

DETAILED DESCRIPTION OF THE INVENTION

A triple-effect absorption chiller of the present invention is described in more detail with the accompanying drawings.

Figure 1A:
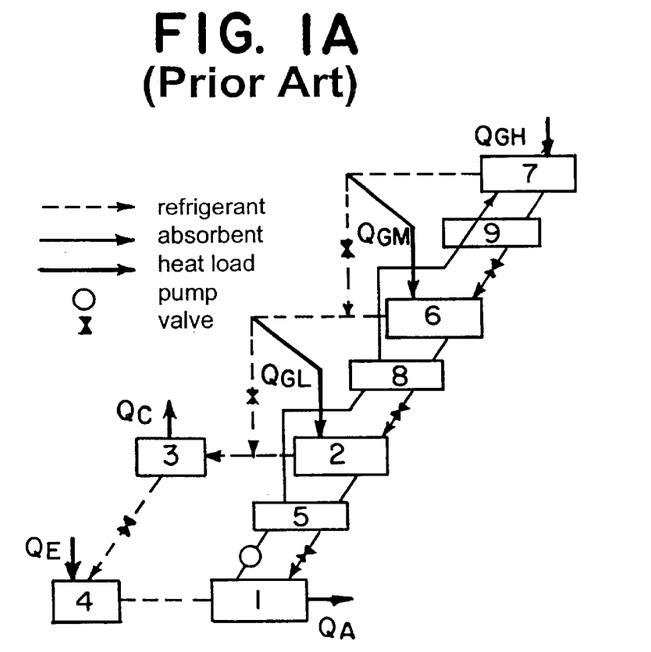
FIG. 1(A) is a schematic diagram of a conventional triple-effect absorption chiller with a single serial-flow cycle.

As shown in FIG. 1(A), a conventional triple-effect absorption chiller with a single serial-flow cycle employing a working fluid of lithium bromide-water solution comprises an absorber(1), a low-temperature generator(GL, 2), a medium-temperature generator(GM, 6), a high-temperature generator(GH, 7), a condenser(3), an evaporator(4) and three heat exchangers of HX1(5), HX2(8), and HX3(9).

Diluted absorbent from the absorber(1) is heat-exchanged through three heat exchangers(5, 8 and 9), then generates a refrigerant vapor from the GH(7) by the input of heat source($Q_{GH}$), then runs into the GM(6) through the HX3(9). The latent heat ($Q_{GM}$), which is generated from the condensation of refrigerant vapor from the GH(7), is used as a heat source for the GM(6) to generate additional refrigerant vapor from the absorbent which comes from the GH(7) through the HX3(9) to the GM(6). The latent heat($Q_{GL}$), which is generated from the combination of condensed refrigerant vapor from the GM(6) and condensed refrigerant liquid from the GH(7), is used as a heat source for the GL(2) to generate additional refrigerant vapor from the absorbent which comes from the GM(6) through the HX2(8) to the GL(2). The refrigerant vapor from the GL(2) is combined with the condensed refrigerant liquids from the GH(7) and GM(6) and the combined refrigerants are condensed in the condenser(3), inputted into the evaporator(4), whereby cooling power($Q_E$) is generated through the phase transition of the combined refrigerants. On the other hand, the thick absorbent from the GL(2) is heat-exchanged through the heat exchanger of HX1(5) to the absorber(1), is diluted through the absorption of the refrigerant vapor from the evaporator(4) to the absorber(1). Therefore, the temperature of each generator should be high enough for the latent heat of the refrigerant vapor from GM(6) and GH(7) to be utilized as an energy source for the next stage generator, which may cause a serious corrosion problems at the GH(7).

In accordance with the present invention, three types of absorption chiller are provided as followings, all of which are developed based on the idea that a triple-effect absorption cycle can be realized even at a low temperature, by elevating the pressure or vapor generated from GH(7), GM(6) or evaporator(4).

Figure 1B:
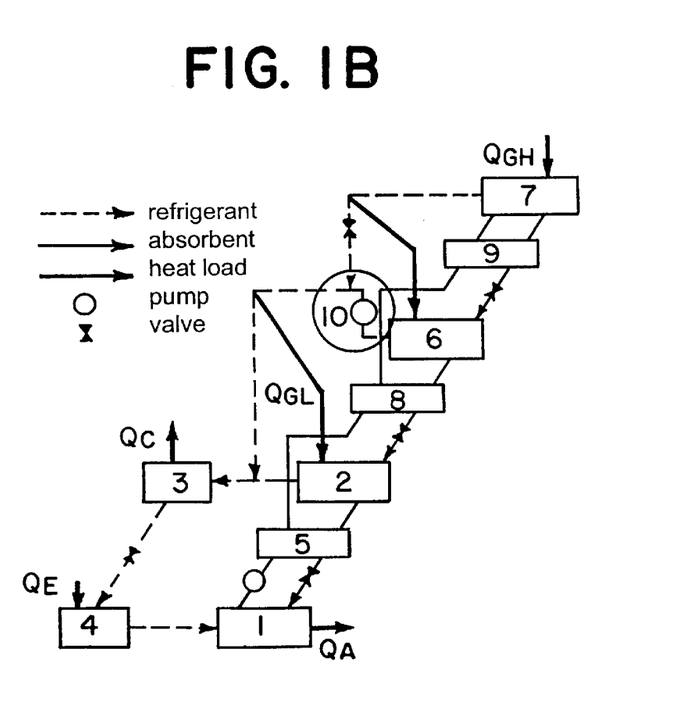
FIG. 1(B) is a schematic diagram of a triple-effect absorption chiller with a vapor compressor connected to a medium-temperature generator.
Figure 1C:
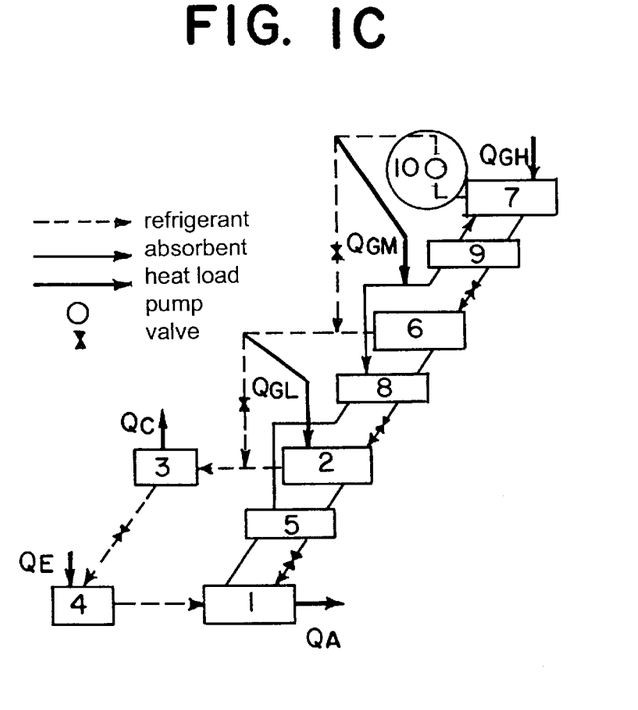
FIG. 1(C) is a schematic diagram of a triple-effect absorption chiller with a vapor compressor connected a high-temperature generator.
Figure 1D:
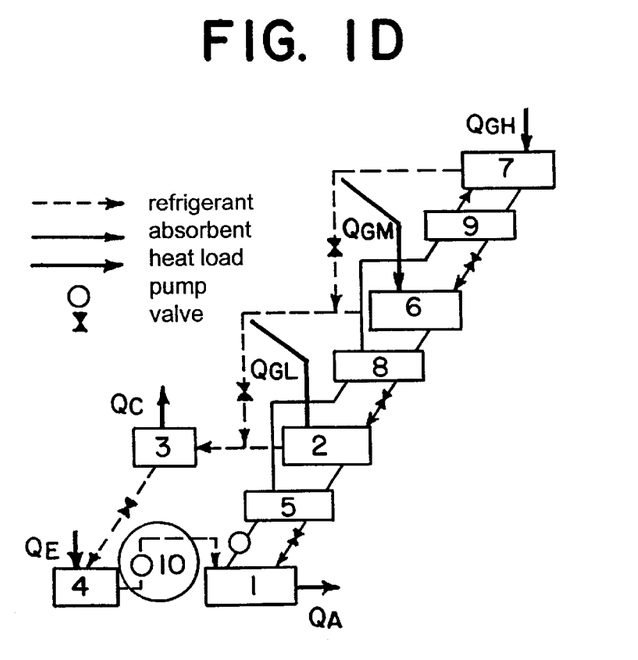
FIG. 1(D) is a schematic diagram of a triple-effect absorption chiller with a vapor compressor connected an evaporator.
Figure 2A:
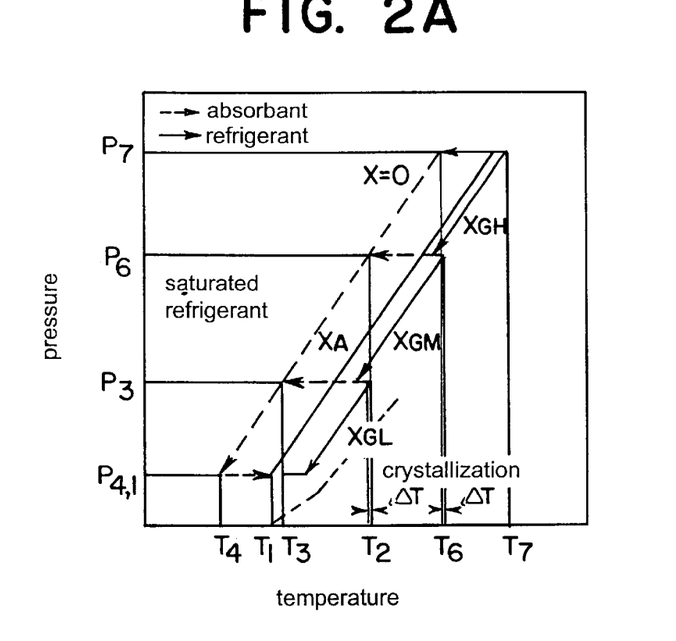
FIG. 2(A) is a Duhring diagram showing a triple-effect absorption cycle of the conventional triple-effect absorption chiller of FIG. 1(A).
Figure 2B:
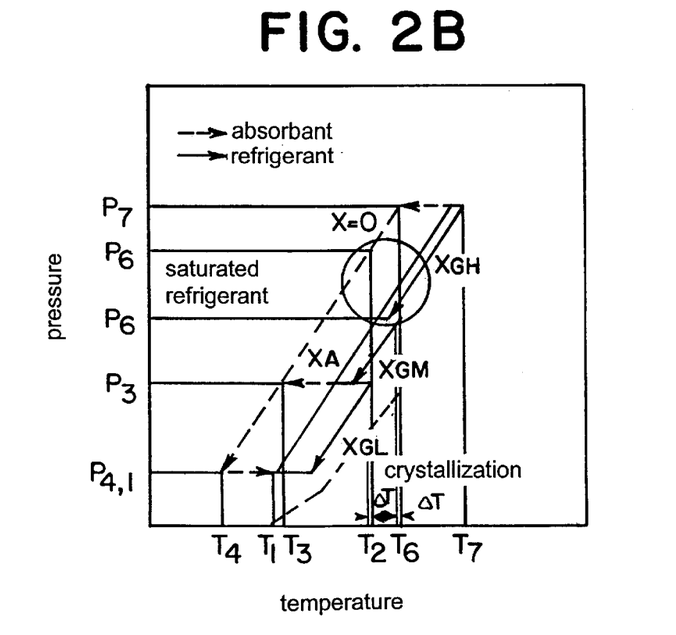
FIG. 2(B) is a Dühring diagram showing a triple-effect absorption cycle of the triple-effect absorption chiller of FIG. 1(B).
Figure 2C:
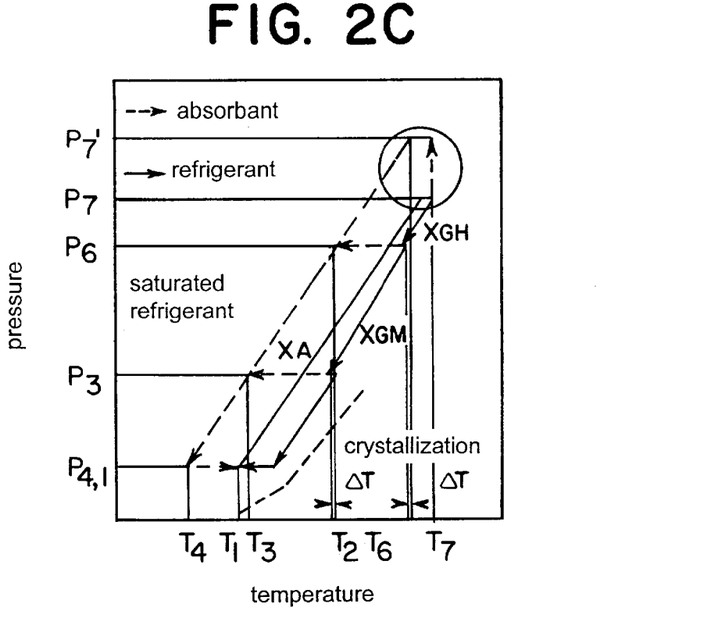
FIG. 2(C) is a Dühring diagram showing triple- effect absorption cycle of the triple-effect absorption chiller of FIG. 1(C).
Figure 2D:
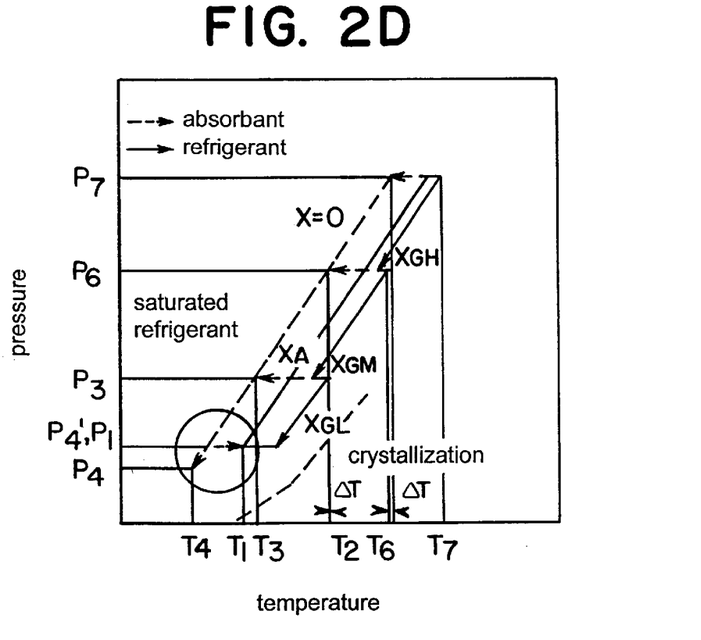
FIG. 2(D) is a Dühring diagram showing triple-effect absorption cycle of the triple-effect absorption chiller of FIG. 1(D).

FIGS. 1(B) to 1(D) depict a triple-effect absorption chiller of the invention, where vapor compressors are connected to GM(6), GH(7) or evaporator(4) to compress the refrigerant vapor generated from GM(6), GH(7) or evaporator(4). Triple-effect absorption chillers of the invention lowers the temperature of GH(7) below 170° C. by reducing the temperature and pressure of GM(6) or GH(7) in the absorption chillers of FIGS. 1(B) and 1(C), or elevating the pressure of absorber(1) in the absorption chiller of FIG. 1(D), which are clearly demonstrated in FIGS. 2(A) to 2(D) and 3.

FIGS. 2(A) to 2(D) are Duhring diagrams showing triple-effect absorption cycle of the triple-effect absorption chillers of FIGS. 1(A) to 1(D), respectively. As shown in FIGS. 2(A) to 2(D), it was clearly demonstrated that the compressor of the triple-effect absorption chiller dramatically lowers the operating temperature of the GH(7) as compared to that of the conventional triple-effect absorption chiller without compressor.

Accordingly, the triple-effect absorption chiller of a single serial-flow cycle where one or more vapor compressors are connected to GM, GH, or evaporator, lowers the temperature of GH temperature below 170° C. by compressing the refrigerant vapor therefrom.

The present invention is further illustrated in the following examples, which should not be taken to limit the scope of the invention.

EXAMPLE

Computer Simulation for Triple-effect Absorption Chiller with Compressor

Computer simulation was performed to examine the operating temperature and performance characteristics of GH of a conventional triple-effect absorption chiller and the chiller of the present invention with vapor compression units under typical operating conditions. The LiBr-water solution is employed as a working fluid in the simulation study, and major assumptions and operating parameters are summarized in the Tables 1 and 2 below, respectively.

TABLE 1

| Major Assumptions for Computer Simulation |
| --- |
| The cycle is operated under a steady-state condition, and the solution is equilibriated under the given condition. |
| The refrigerant is completely vaporized in the evaporator, and the evaporated vapor is completely absorbed in the absorber. |
| The pump work for circulating the solution is neglected. |
| The refrigerant vapor generated from GH is completely condensed, and the heat of condensation is transferred to GM as an energy source. |
| The refrigerant vapor generated from GM is completely condensed, and the heat of condensation is transferred to GL as an energy source. |

TABLE 2

| Operating Conditions for Computer Simulation | |
| --- | --- |
| Parameter | Fixed Value |
| Cooling capacity | 1 RT (3.516 kW) |
| Temperature at the evaporator outlet ($T_4$) | 5° C. |
| Temperature at the absorber outlet ($T_1$) | 37° C. |
| Temperature at the condenser outlet ($T_3$) | 40° C. |
| Solution flow rate in the absorber outlet | 25 g/s |
| Efficiency of heat exchangers (5, 8, and 9) | 0.7, 0.75, 0.8 |
| Temperature difference ($\Delta T$) between GL and GM | 2° C. |

Figure 3:
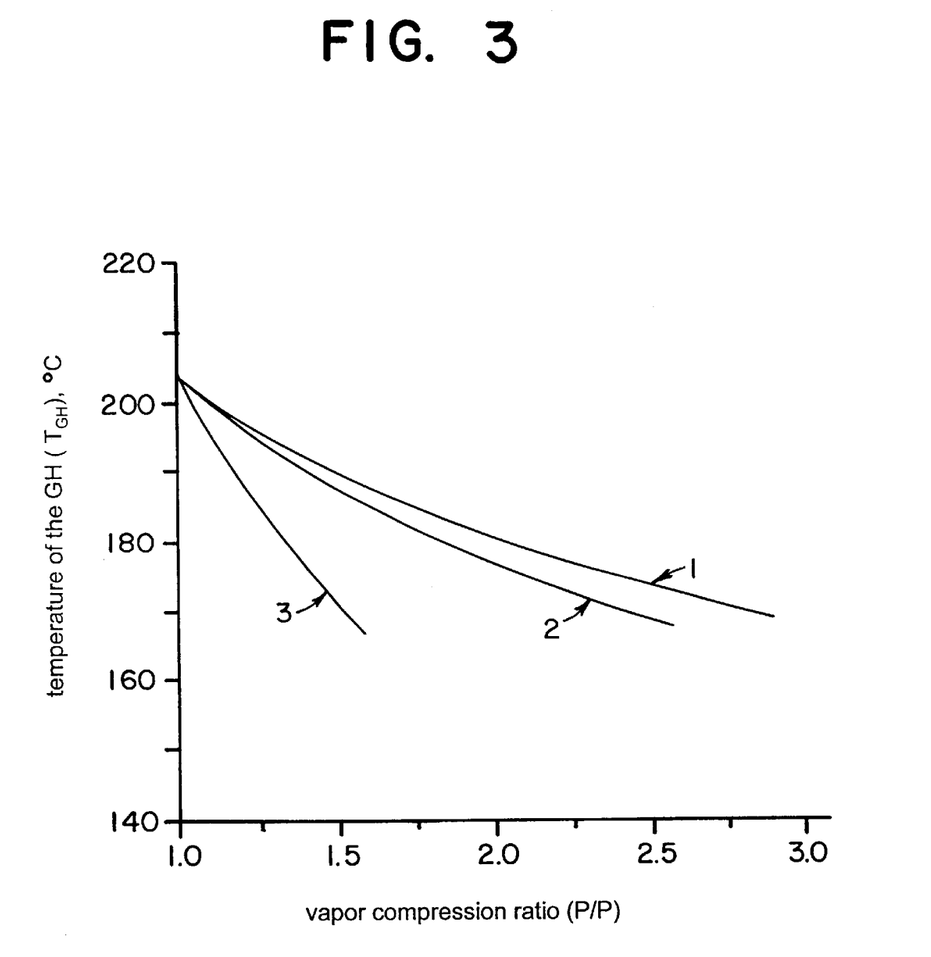
FIG. 3 is a graph showing the temperature decrease of high-temperature generator of a triple-effect absorption chiller depending on the pressure compression ratios.

FIG. 3 shows the decrease of GH temperature depending on the vapor compression ratios(P and P' represent values of pressure before and after compression, respectively), where numerals 1), 2), and 3) represent the corresponding triple-effect absorption chillers of FIGS. 1(B), 1(C) and 1(D), respectively, and the value 1 of compression ratio(P'/P) is assigned for a conventional triple-effect absorption chiller. As shown in FIG. 3, the GH temperature of the conventional chiller without vapor compressor is about 203.5° C., while those of the present chillers are decreased to a preferable region of below 170° C., with increasing vapor compression ratio. Accordingly, it was clearly demonstrated that the triple-effect absorption chiller of the invention can be practically applied by employing a working fluid of conventional lithium bromide-water solution without the corrosion of the metal part of GH.

Figure 4:
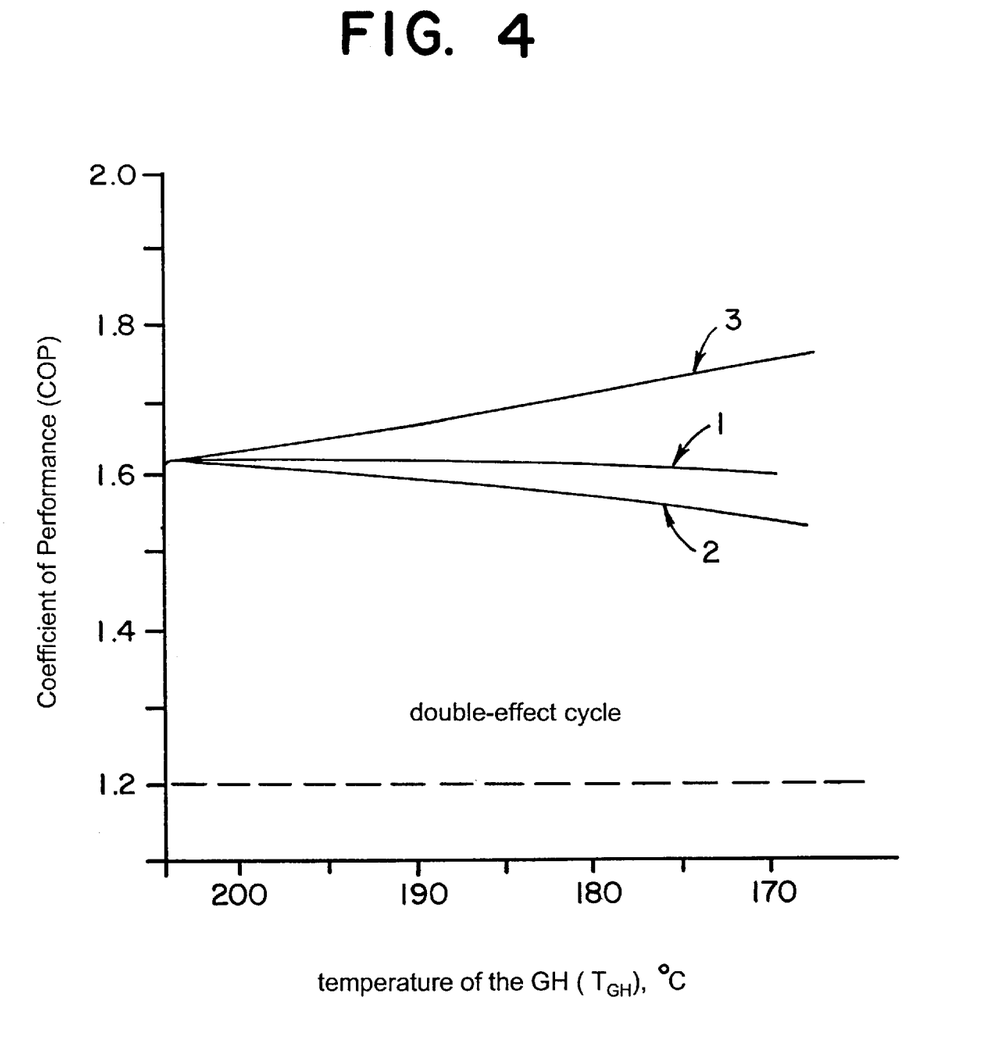
FIG. 4 is a graph showing COPs of a triple-effect absorption chiller depending on the temperature decrease of high-temperature generator.

FIG. 4 shows COPs(coefficients of performance) of a triple-effect absorption chiller depending on the temperature decrease of GH. The efficiency of absorption cooling cycle is represented as 'COP', i.e., the ratio of cooling capacity ($Q_E$) to the heat input ($Q_{GH}$), thus the larger value of COP provides the more cooling capacity from the limited energy. The work for the compressor operation of each cycle is considered as the additional heat input in the calculation of the COPs. In order to obtain the compressor work, the ideal work was first calculated by assuming an isoentropic compression process, then was divided by typical compressor efficiency 0.7. In FIG. 4, numerals 1), 2), and 3) represent the triple-effect absorption chillers of FIGS. 1(B), 1(C) and 1(D), respectively, and the value of COP without the decrement of the GH temperature is about 1.62, which is similar to the conventional triple-effect cycle. As shown in FIG. 4, COPs of the triple-effect cycles are larger than the value of 1.2 of the double-effect cycle: COPs of 1) and 2) cycles decrease with decreasing GH temperature, since much compressor works are required for decreasing the corresponding GH temperature; and, COP of 3) cycle substantially increases, though more compressor work is required for lowering the GH temperature, indicating that the efficiency of absorption cycle itself is improved by employing the compressor. Accordingly, it was clearly demonstrated that the triple-effect absorption chiller with compressor units can be practically applied for lowering the temperature of GH, while COPs are not decreased or occasionally increased.

Figure 5:
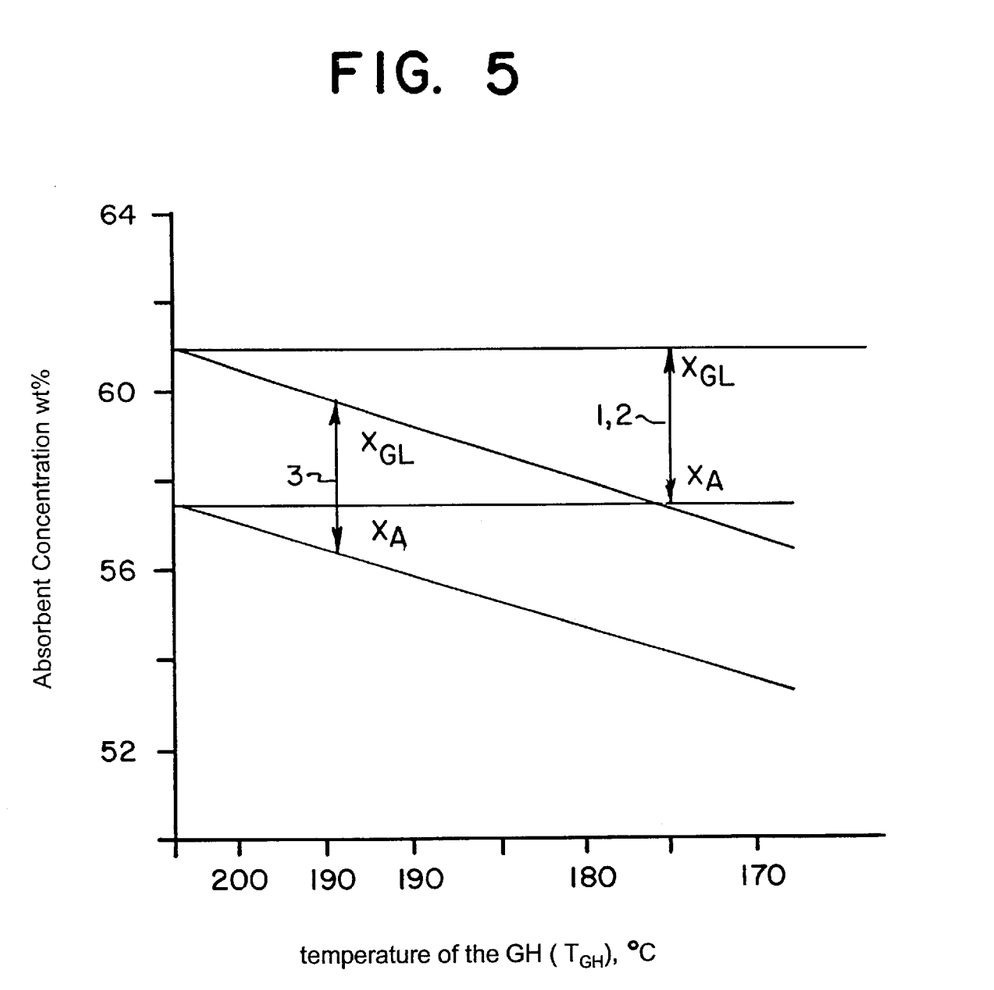
FIG. 5 is a graph showing the inlet and outlet concentrations of absorber of a triple-effect absorption chiller depending on the temperature decrease of high-temperature generator.

FIG. 5 shows inlet ($X_{GL}$) and outlet($X_A$) concentrations of the absorber depending on the temperature decrease of GH by simulating the present cycles. The performance characteristics of the absorption chiller are related to the inlet and outlet concentrations, and the difference between them as well. In FIG. 5, numerals 1), 2), and 3) represent triple-effect absorption chillers of FIGS. 1(B), 1(C) and 1(D), respectively. The inlet and outlet concentrations without the decrement of GH temperature(in the case of the triple-effect absorption chiller of the present invention without compression operation) are about 61% and about 57.5%, respectively, which are similar to the conventional triple-effect cycle. The inlet and outlet concentrations of 3) are lowered with decreasing the GH temperature, while those of 1) and 2) are the same as those of the conventional chiller. Accordingly, the performance of the triple-effect absorption chillers corresponding to 1) and 2) are expected to be similar to that of the conventional chiller, while the absorber of the chiller corresponding to 3) may provide more or less decreased performance due to the lowered inlet and outlet concentrations.

As clearly illustrated and demonstrated above, the present invention provides a triple-effect absorption chiller with vapor compression units, where one or more vapor compressors are connected to GM, GH, or evaporator of the conventional chiller, to compress refrigerant vapor from the said generators or evaporator, thereby lowering the GH temperature to a preferable range of below 170° C. The triple-effect absorption chiller of the present invention can be practically applied for lowering the temperature of GH, without the corrosion due to the high temperature of GH.

What is claimed is:

1. A triple-effect absorption chiller of a single-flow cycle that uses a refrigerant comprising:

a low temperature generator, a medium-temperature generator, a high temperature generator, a condenser and an evaporator through which the refrigerant flows, an absorber, and at least one heat exchanger; and a vapor compressor connected to at least one of said medium-temperature generator, said high-temperature generator, or said evaporator to compress refrigerant vapor from the said at least one generator or evaporator to lower the temperature of the refrigerant in the high-temperature generator to below 170° C.

2. The triple-effect absorption chiller of claim 1, wherein an absorbent in the absorber is inorganic salt-based solution and the refrigerant is water, respectively.

3. The triple-effect absorption chiller of claim 2, wherein the inorganic salt-based solution is lithium bromide aqueous solution.

* * * * *